US012327473B2

(12) United States Patent
Konashi

(10) Patent No.: US 12,327,473 B2
(45) Date of Patent: Jun. 10, 2025

(54) VEHICLE MONITORING SYSTEM, VEHICLE MONITORING METHOD, AND VEHICLE MONITORING APPARATUS

(71) Applicant: NEC Corporation, Tokyo (JP)

(72) Inventor: Takashi Konashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 229 days.

(21) Appl. No.: 17/795,942

(22) PCT Filed: Jan. 31, 2020

(86) PCT No.: PCT/JP2020/003695
§ 371 (c)(1),
(2) Date: Jul. 28, 2022

(87) PCT Pub. No.: WO2021/152824
PCT Pub. Date: Aug. 5, 2021

(65) Prior Publication Data

US 2023/0123186 A1 Apr. 20, 2023

(51) Int. Cl.
*G08G 1/04* (2006.01)
*G08G 1/017* (2006.01)

(52) U.S. Cl.
CPC ............... *G08G 1/04* (2013.01); *G08G 1/017* (2013.01)

(58) Field of Classification Search
CPC ........................................................ G08G 1/04
See application file for complete search history.

(56) References Cited

U.S. PATENT DOCUMENTS 7,652,245 B2 * 1/2010 Crickmore ......... G01D 5/35361 250/227.12
10,198,946 B2 * 2/2019 Crickmore ............... G08G 1/04
11,594,038 B2 * 2/2023 Bandai ................... G06V 10/96
12,025,477 B2 * 7/2024 Hino .................. G01D 5/35358
2008/0277568 A1 11/2008 Crickmore et al.
2022/0327923 A1 * 10/2022 Tanaka ................. G08G 1/0133

(Continued)

FOREIGN PATENT DOCUMENTS

| | | | |
|---|---|---|---|
| CN | 107591002 A | | 1/2018 |
| CN | 107591002 B | * | 6/2020 |
| JP | H10-19510 A | | 6/1996 |

(Continued)

OTHER PUBLICATIONS

International Search Report for PCT Application No. PCT/JP2020/003695, mailed on Mar. 3, 2020.

(Continued)

*Primary Examiner* — Michael A Berns

(57) ABSTRACT

A vehicle monitoring system according to the present disclosure includes: an optical fiber for sensing (10) laid on a road (40); a vehicle passage detection unit (30) configured to detect that a vehicle (50) has passed a predetermined location on the road (40); an identification unit (202) configured to identify the vehicle (50) that has passed the predetermined location as a vehicle-to-be-monitored; and a reception unit (201) configured to receive sound information unique to the vehicle-to-be-monitored detected by the optical fiber for sensing (10), in which the identification unit (202) identifies the vehicle-to-be-monitored based on the sound information unique to the vehicle-to-be-monitored.

11 Claims, 10 Drawing Sheets

(56) References Cited

U.S. PATENT DOCUMENTS

2023/0123186 A1* 4/2023 Konashi ................. G08G 1/017
701/117
2023/0152150 A1* 5/2023 Chen ......................... G01P 3/36
73/655

FOREIGN PATENT DOCUMENTS

JP 2009-514081 A 10/2005
WO 2014/174318 A1 4/2013

OTHER PUBLICATIONS

JP Office Action for JP Application No. 2021-574407, mailed on Jul. 11, 2023 with English Translation.

* cited by examiner

| VEHICLE PASSAGE DETECTION UNIT | DETECTION POINT | DISTANCE FROM VEHICLE MONITORING APPARATUS |
|---|---|---|
| 30-X1 | 11-A | aa [m] |
| 30-X2 | 11-G | gg [m] |
| ... | ... | ... |

Fig. 2

| DETECTION POINT | DISTANCE FROM VEHICLE MONITORING APPARATUS | VEHICLE REGISTRATION PLATE NUMBER READING APPARATUS |
|---|---|---|
| 11-A | aa [m] | 30A-X1 |
| 11-B | bb [m] | — |
| ... | ... | ... |

Fig. 5

| VEHICLE REGISTRATION PLATE NUMBER | FEATURE | | TRAJECTORY OF LOCATION | |
|---|---|---|---|---|
| | VEHICLE TYPE | TIRE TYPE | TIME | DETECTION POINT |
| 12-34 | PASSENGER CAR | NORMAL | 01/01/10:00 | 11-C |
| | | | 01/01/10:10 | 11-D |
| | | | ... | ... |
| 22-11 | PASSENGER CAR | NORMAL | ... | ... |
| | | | ... | ... |
| ... | ... | ... | ... | ... |

Fig. 6

VEHICLE MONITORING SYSTEM, VEHICLE MONITORING METHOD, AND VEHICLE MONITORING APPARATUS

This application is a National Stage Entry of PCT/JP2020/003695 filed on Jan. 31, 2020, the contents of all of which are incorporated herein by reference, in their entirety.

TECHNICAL FIELD

The present disclosure relates to a vehicle monitoring system, a vehicle monitoring method, and a vehicle monitoring apparatus.

BACKGROUND ART

In recent years, systems for monitoring vehicles (automobiles) traveling on roads using optical fibers have been proposed (e.g. Patent Literature 1).

In the technique disclosed in Patent Literature 1, optical fibers are laid under roads and two pulses (one of the pulses being delayed with respect to the other one of the pulses) are made incident on the optical fibers and backscattered pulses of the two pulses at the start and end points of a specified section of the optical fibers, respectively, are detected. At this time, when there is a moving vehicle in the specified section, frequency deviation occurs due to the pressure change in the specified section. Utilizing such frequency deviation, it is detected that there is a moving vehicle present in the specified section.

CITATION LIST

Patent Literature

[Patent Literature 1] Published Japanese Translation of PCT International Publication for Patent Application, No. 2009-514081

SUMMARY OF INVENTION

Technical Problem

In the technique disclosed in Patent Literature 1, when the aforementioned frequency deviation is occurring in the specified section of the optical fibers, it can be detected that there is a moving vehicle present in the specified section. However, when attempting to monitor a specific vehicle-to-be-monitored traveling on the road, it cannot be determined whether the vehicle that is detected in the specified section is the vehicle-to-be-monitored, which leads to a problem that it is difficult to perform monitoring of a vehicle-to-be-monitored.

Therefore, an object of the present disclosure is to provide a vehicle monitoring system, a vehicle monitoring method, and a vehicle monitoring apparatus each adapted to solve the aforementioned problem and to monitor a vehicle-to-be-monitored with high accuracy.

Solution to Problem

An aspect of the present disclosure is a vehicle monitoring system including:

an optical fiber for sensing laid on a road;

a vehicle passage detection unit configured to detect that a vehicle has passed a predetermined location on the road;

an identification unit configured to identify the vehicle that has passed the predetermined location as a vehicle-to-be-monitored; and a reception unit configured to receive sound information unique to the vehicle-to-be-monitored detected by the optical fiber for sensing, in which the identification unit identifies the vehicle-to-be-monitored based on the sound information unique to the vehicle-to-be-monitored.

An aspect of the present disclosure is a vehicle monitoring method performed by a vehicle monitoring system, including:

a vehicle passage detection step of detecting that a vehicle has passed a predetermined location on a road;

a first identification step of identifying the vehicle that has passed the predetermined location as a vehicle-to-be-monitored;

a reception step of receiving sound information unique to the vehicle-to-be-monitored detected by an optical fiber for sensing laid on the road; and a second identification step of identifying the vehicle-to-be-monitored based on the sound information unique to the vehicle-to-be-monitored.

An aspect of the present disclosure is a vehicle monitoring apparatus including:

an identification unit configured to identify a vehicle that has passed a predetermined location on a road as a vehicle-to-be-monitored; and a reception unit configured to receive sound information unique to the vehicle-to-be-monitored detected by an optical fiber for sensing laid on the road, in which the identification unit identifies the vehicle-to-be-monitored based on the sound information unique to the vehicle-to-be-monitored.

Advantageous Effects of Invention

According to the aforementioned aspects of the present disclosure, an effect of providing a vehicle monitoring system, a vehicle monitoring method, and a vehicle monitoring apparatus each adapted to monitor a vehicle-to-be-monitored with high accuracy can be obtained.

BRIEF DESCRIPTION OF DRAWINGS

FIG. 2 is a diagram showing an example of the contents of a correspondence table held by an identification unit according to the first example embodiment;

FIG. 5 is a diagram showing an example of the contents of a correspondence table held by an acquisition unit according to the second example embodiment;

FIG. 6 is a diagram showing an example of the contents of a vehicle DB according to the second example embodiment;

EXAMPLE EMBODIMENT

Figure 1:
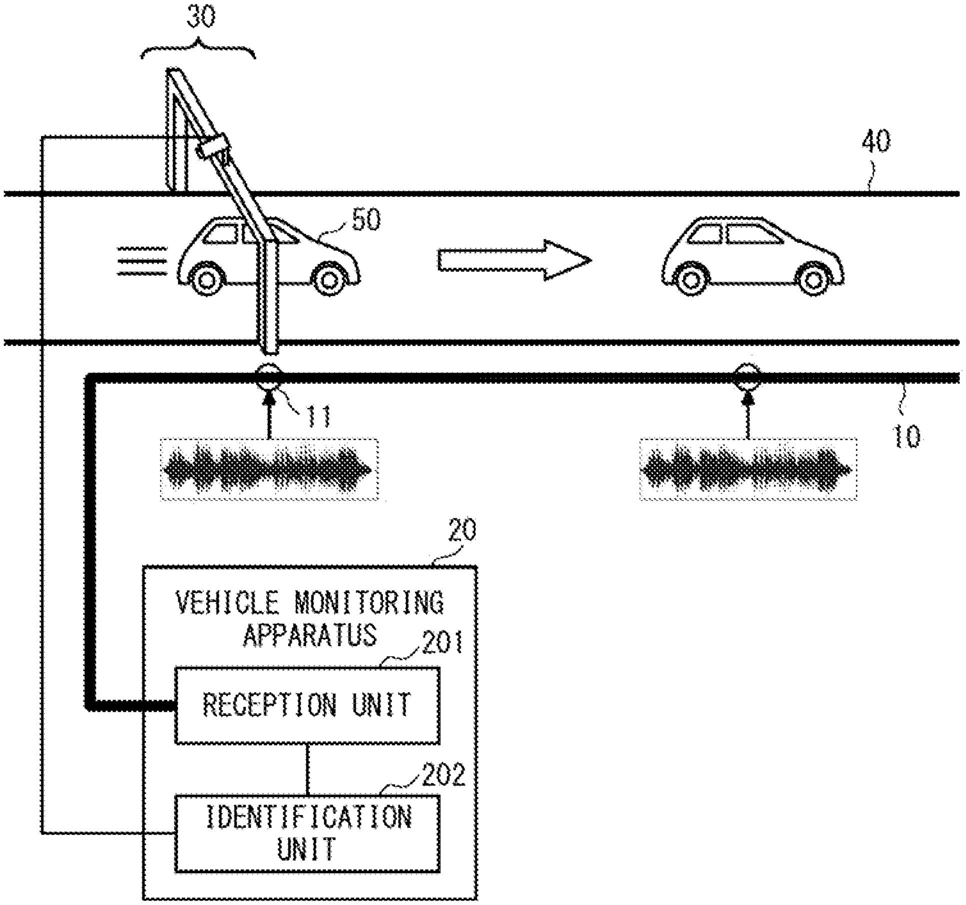
FIG. 1 is a diagram showing a configuration example of a vehicle monitoring system according to a first example embodiment.

Hereinbelow, example embodiments of the present disclosure will be described with reference to the drawings. Note that the following description and the attached drawings are appropriately shortened and simplified where appropriate to clarify the explanation. In the drawings, the identical reference symbols denote identical structural elements and redundant explanations thereof are omitted as necessary.

First Example Embodiment

First, a configuration example of a vehicle monitoring system according to a first example embodiment will be described with reference to FIG. 1.

As shown in FIG. 1, the vehicle monitoring system according to this first example embodiment includes an optical fiber for sensing 10, a vehicle monitoring apparatus 20, and a vehicle passage detecting unit 30. Further, the vehicle monitoring apparatus 20 includes a reception unit 201 and an identification unit 202.

The optical fiber for sensing 10 is laid along a road 40. Note that in FIG. 1, the optical fiber for sensing 10 is intended to be laid on the side of the road 40 but the method of laying the optical fiber for sensing 10 is not limited thereto. For instance, the optical fiber for sensing 10 may be buried under the road 40. Further, the road 40 may be any road such as an expressway or a local road as long as the optical fiber for sensing 10 is laid. Further, the optical fiber for sensing 10 may be laid on the road 40 in a form of a cable configured by coating one or more optical fibers for sensing 10. Further, the optical fiber for sensing 10 may be an existing optical fiber for communication or may be a newly laid optical fiber.

The vehicle passage detecting unit 30 is configured to detect that a vehicle 50 has passed a predetermined location on the road 40. In FIG. 1, the vehicle passage detecting unit 30 is intended to be a vehicle registration plate number reading apparatus used in N (Number)-systems or the like installed at a predetermined location on the road 40. The vehicle registration plate number reading apparatus captures an image of a vehicle 50 before it passes thereby with a camera and reads the vehicle registration plate number of the vehicle 50 that has passed thereby from the camera image. However, the vehicle passage detecting unit 30 is not limited to a vehicle registration plate number reading apparatus. For example, the vehicle passage detecting unit 30 may be an ETC (Electronic Toll Collection) gate installed at a predetermined location on the road 40. The ETC gate performs communication with an ETC on-board device installed on the vehicle 50 that has passed through the ETC gate and obtains information recorded on the ETC card inserted in the ETC on-board device.

The identification unit 202 identifies the vehicle 50 that is detected by the vehicle passage detecting unit 30 as having passed the predetermined location on the road 40 as the vehicle-to-be-monitored.

The reception unit 201 receives the reflected lights and the scattered lights that are generated when the pulsed lights are made incident on the optical fiber for sensing 10 and the incident pulsed lights are transmitted through the optical fiber for sensing 10 as return lights (optical signals) through the optical fiber for sensing 10.

Here, when the vehicle 50 travels on the road 40, sounds such as an exhaust sound, road noise, and so forth are generated. These sounds are transmitted to the optical fiber for sensing 10 whereby the characteristics (e.g. wavelengths) of the return lights transmitted through the optical fiber for sensing 10 change. Accordingly, the optical fiber for sensing 10 can detect sound information indicating sounds generated due to traveling of the vehicle 50 on the road 40. Further, since the characteristics of the return lights that are transmitted through the optical fiber for sensing 10 change in accordance with the sound information detected by the optical fiber for sensing 10, the return lights include the sound information detected by the optical fiber for sensing 10.

Further, the sound information generated due to traveling of the vehicle 50 on the road 40 is a dynamically varying sound pattern and indicates a unique sound pattern with different sound intensity, sound fluctuation transition, and so forth depending on the vehicle 50 that traveled on the road 40. In FIG. 1, the sound information detected at any given detection point 11 in the optical fiber for sensing 10 is shown under the pertinent detection point 11. The sound information shown in FIG. 1 indicates time on the horizontal axis and sound intensity on the vertical axis, and shows a sound pattern corresponding to the vehicle 50 that is traveling on the road 40.

Therefore, the return lights received by the reception unit 201 include the sound information unique to the vehicle 50 that traveled on the road 40.

Accordingly, the return lights also include the sound information unique to the vehicle-to-be-monitored identified by the identification unit 202. Therefore, the identification unit 202 is able to identify the vehicle-to-be-monitored based on the sound information unique to the vehicle-to-be-monitored included in the return lights.

Here, the identification unit 202 can identify, based on, for example, the time difference between when the reception unit 201 transmits the pulsed lights to the optical fiber for sensing 10 and when the reception unit 201 receives the return lights, and the intensity and the like of the return lights received by the reception unit 201, at which locations (the distance from the vehicle monitoring apparatus 20) in the optical fiber for sensing 10 the received return lights were generated.

Further, the identification unit 202 holds, in advance, a correspondence table for each vehicle passage detecting unit 30, the correspondence table being a table in which an identification number for identifying the vehicle passage detecting unit 30, the detection point 11 corresponding to the predetermined location at which passage of the vehicle 50 is detected by the vehicle passage detecting unit 30, and the location information indicating the location (the distance from the vehicle monitoring apparatus 20) of the pertinent detection point 11 are in correspondence relationship with one another. An example of the contents of the correspondence table is shown in FIG. 2. Note that in FIG. 2, it is assumed that there are a plurality of vehicle passage detecting units 30 present along the road 40, but at least one vehicle passage detecting unit 30 may be present along the road 40.

Therefore, the identification unit 202 can obtain the sound information detected by the optical fiber for sensing 10 at the detection point 11 corresponding to the predetermined location on the road 40. Therefore, the sound information of the vehicle 50 detected by the optical fiber for sensing 10 at the detection point 11 corresponding to the predetermined location may be obtained when the vehicle passage detecting unit 30 detects that the vehicle-to-be-monitored has passed the predetermined location on the road 40, and the obtained sound information may be identified as the sound information unique to the vehicle-to-be-monitored.

Further, as described above, the identification unit 202 can identify at which locations in the optical fiber for sensing 10 the return lights received by the reception unit 201 were generated.

Therefore, the identification unit 202 is able to identify the location of the vehicle-to-be-monitored by identifying at which locations in the optical fiber for sensing 10 the return lights including the sound information unique to the vehicle-to-be-monitored were generated.

Further, as described above, the sound information generated due to traveling of the vehicle 50 on the road 40 indicates a unique sound pattern corresponding to the pertinent traveling vehicle 50. Here, this sound pattern is considered to differ depending on the features of the vehicle 50. Here, the features of the vehicle 50 are, for example, the vehicle type (e.g. a general passenger car, a bus, a truck, etc.), the tire type (e.g. normal tires, studless tires, tires with chains, etc.), and so on.

Therefore, the identification unit 202 is able to identify the features of the vehicle-to-be-monitored by analyzing the dynamic variation in the sound pattern indicated by the sound information unique to the vehicle-to-be-monitored.

A method of identifying the features of the vehicle-to-be-monitored in the identification unit 202 may be a method utilizing pattern matching. For example, the identification unit 202 holds, in advance for each vehicle type, the sound pattern corresponding to the vehicle type as the matching pattern. The identification unit 202 compares the sound pattern indicated by the sound information of the vehicle-to-be-monitored with the matching pattern for each vehicle type. When there is a matching pattern which matches the sound pattern of the vehicle-to-be-monitored at a matching rate higher than a threshold value among the matching patterns, the identification unit 202 determines that the vehicle type of the vehicle-to-be-monitored is the vehicle type corresponding to that matching pattern. Further, with regard to the tire type, the identification unit 202 may hold the matching pattern for each tire type in advance and determine the tire type of the vehicle-to-be-monitored by the same method as that for determining the vehicle type.

Further, a method of identifying the features of the vehicle-to-be-monitored in the identification unit 202 may be a method utilizing a training model of a Convolutional Neural Network (CNN). For example, the identification unit 202 inputs a plurality of pairs of the training data indicating the vehicle types and the sound patterns corresponding to the vehicle types, and pre-builds and holds a learning model for each vehicle type. The identification unit 202 inputs the sound pattern indicating the sound information of the vehicle-to-be-monitored in the learning model. Accordingly, the identification unit 202 obtains the vehicle type of the vehicle-to-be-monitored as a result of output of the learning model. Further, also regarding the tire type, the identification unit 202 may build and hold a learning model in advance and determine the tire type of the vehicle-to-be-monitored by the same method as that for determining the vehicle type.

Note that in the identification unit 202, the sound pattern used for identifying the vehicle-to-be-monitored is not limited to the sound patterns of the sound information like those shown in FIG. 1. For example, the sound pattern used for identifying the vehicle-to-be-monitored may be a sound pattern of sound information obtained by performing frequency analysis of the sound information shown in FIG. 1 or may be a sound pattern of sound information obtained by performing further filtering of the aforementioned frequency-analyzed sound information.

Further, as described above, the identification unit 202 can identify the location of the vehicle-to-be-monitored based on the sound information unique to the vehicle-to-be-monitored detected by the optical fiber for sensing 10 at the arbitrary detection point 11.

Therefore, the identification unit 202 may identify the trajectory of the location of the vehicle-to-be-monitored based on the sound information unique to the vehicle-to-be-monitored detected by the optical fiber for sensing 10 at a plurality of detection points 11 (two detection points 11 in FIG. 1) and track the vehicle-to-be-monitored based on the identified trajectory of the location of the vehicle-to-be-monitored.

Further, as described above, a vehicle registration plate number reading apparatus can be employed for the vehicle passage detecting unit 30. The vehicle passage detecting unit 30 that is a vehicle registration plate number reading apparatus can not only detect passage of the vehicle 50 but can also read the vehicle registration plate number of the vehicle 50 that has passed thereby.

Therefore, the identification unit 202 may hold the features and the location of the vehicle-to-be-monitored in correspondence relationship with the vehicle registration plate of the vehicle-to-be monitored.

Next, overall operation flow of the vehicle monitoring system according to this first example embodiment will be described with reference to FIG. 3.

Figure 3:
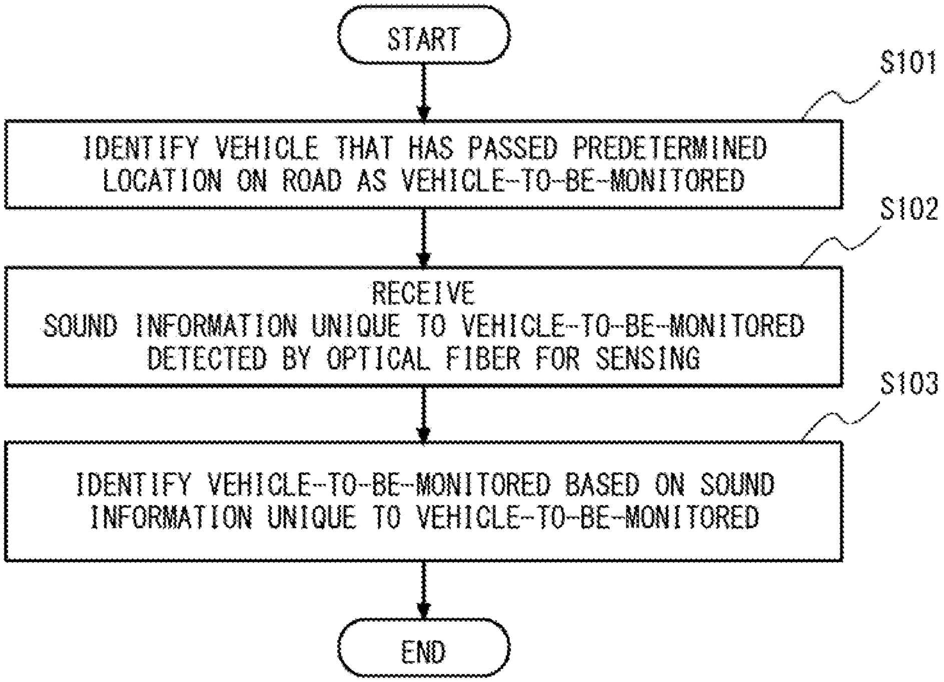
FIG. 3 is a flowchart showing an example of overall operation flow of the vehicle monitoring system according to the first example embodiment.

As shown in FIG. 3, when the vehicle passage detecting unit 30 detects that the vehicle 50 has passed the predetermined location on the road 40, the identification unit 202 identifies the vehicle 50 detected by the vehicle passage detecting unit 30 as the vehicle-to-be-monitored (Step S101).

On the other hand, the reception unit 201 receives, from the optical fiber for sensing 10, return lights including the sound information unique to the vehicle-to-be-monitored detected by the optical fiber for sensing 10 (Step S102).

Then, the identification unit 202 identifies the vehicle-to-be-monitored based on the sound information unique to the vehicle-to-be-monitored included in the return lights received by the reception unit 201 (Step S103).

As described above, according to this first example embodiment, the identification unit 202 identifies the vehicle 50 that has passed the predetermined location on the road 40 as the vehicle-to-be-monitored. The reception unit 201 receives the sound information unique to the vehicle-to-be-monitored detected by the optical fiber for sensing 10. The identification unit 202 identifies the vehicle-to-be-monitored based on the sound information unique to the vehicle-to-be-monitored. Therefore, since the vehicle-to-be-monitored can be identified among a plurality of vehicles 50 traveling on the road 40, the vehicle-to-be-monitored can be monitored with high accuracy.

Further, monitoring of the vehicle-to-be-monitored can be performed using N-systems that read the vehicle registration plate numbers of the plurality of vehicles 50 from the camera images. However, the range that is monitorable by each N-system is limited to the range within which a camera is installed, and the vehicle-to-be-monitored cannot be monitored outside this range. Further, monitoring of the vehicle-to-be monitored can also be performed by installing a positioning apparatus utilizing GPS (Global Positioning System) and the like on the vehicle-to-be-monitored and acquiring location information measured by the vehicle-to-be-monitored. However, since it is up to the owner of the vehicle-to-be-monitored to decide whether or not to install a positioning apparatus and whether or not to transmit the location information, the location information of the vehicle-to-be-monitored cannot always be acquired.

On the other hand, according to this first example embodiment, since monitoring of the vehicles-to-be-monitored can be performed as long as there are optical fibers for sensing 10, it is possible to monitor the vehicle-to-be-monitored over a wide range where the optical fibers for sensing 10 are laid.

Further, according to the first example embodiment, an existing optical fiber for communication may be employed for the optical fiber for sensing 10. In such case, since there is no need to prepare any additional equipment for performing monitoring of the vehicle-to-be-monitored, it is possible to configure a vehicle monitoring system at a low cost.

Further, according to this first example embodiment, an optical fiber sensing technique is utilized in which the optical fiber for sensing 10 is employed as the sensor. Accordingly, it is possible to gain advantages such as being free of the influence of the electromagnetic noise, eliminating the need to feed power to the sensors, excellent environmental tolerance, and easier maintenance.

Second Example Embodiment

A vehicle monitoring system according to a second example embodiment is a more specific version of the aforementioned vehicle monitoring system according to the first example embodiment.

Hereinbelow, a configuration example of a vehicle monitoring system according to the second example embodiment will be described with reference to FIG. 4.

Figure 4:
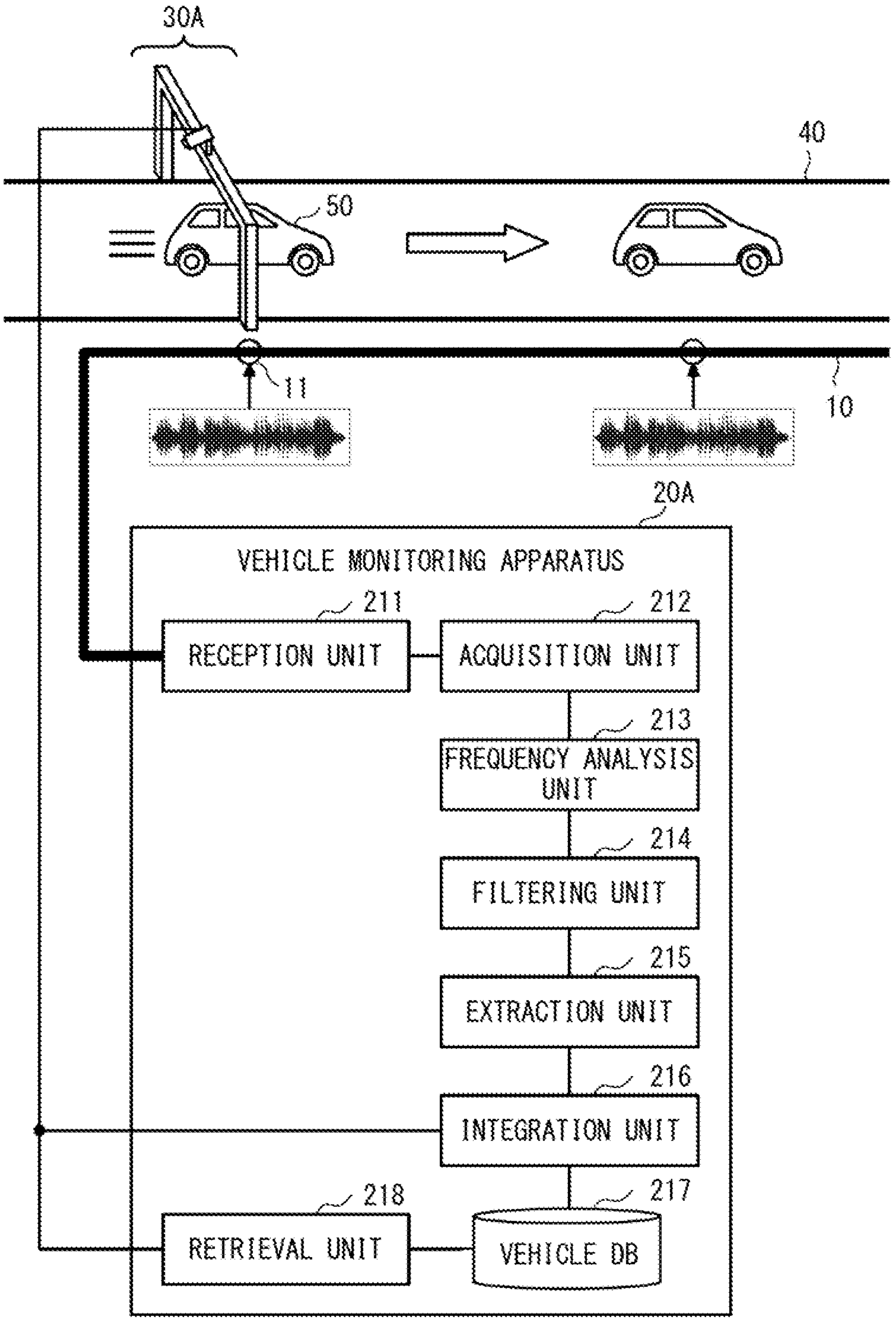
FIG. 4 is a diagram showing a configuration example of a vehicle monitoring system according to a second example embodiment.

As shown in FIG. 4, the vehicle monitoring system according to the second example embodiment is configured by replacing the vehicle monitoring apparatus 20 according to the first example embodiment with a vehicle monitoring system 20A and replacing the vehicle passage detecting unit 30 with a vehicle registration plate number reading apparatus 30A.

The vehicle monitoring apparatus 20A includes a reception unit 211, an acquisition unit 212, a frequency analysis unit 213, a filtering unit 214, an extraction unit 215, an integration unit 216, a vehicle DB (Database) 217, and a retrieval unit 218.

Note that the reception unit 211 corresponds to the reception unit 201 shown in FIG. 1. Further, the combination of the acquisition unit 212, the frequency analysis unit 213, the filtering unit 214, the extraction unit 215, the integration unit 216, the vehicle DB 217, and the retrieval unit 218 correspond to the identification unit 202 shown in FIG. 1.

The reception unit 211 receives the reflected lights and the scattered lights that were generated due to the pulsed lights being made incident on the optical fiber for sensing 10 and the incident pulsed lights being transmitted through the optical fiber for sensing 10 as return lights (optical signals) through the optical fiber for sensing 10. The return lights received by the reception unit 211 include sound information indicating sounds generated by the vehicle 50 traveling on the road 40.

The acquisition unit 212 can identify, based on, for example the time difference between when the reception unit 211 transmits pulsed lights to the optical fiber for sensing 10 and when the reception unit 211 receives the return lights, and the light intensity and the like of the return lights received by the reception unit 211, at which locations (the distance from the vehicle monitoring apparatus 20A) in the optical fiber for sensing 10 the return lights were generated.

Further, the acquisition unit 212 holds, in advance a correspondence table for each detection point 11 of the plurality of detection points 11 in the optical fiber for sensing 10, the correspondence table being a table in which an identification number for identifying each identification point 11 and the location information indicating the location (the distance from the vehicle monitoring apparatus 20) of each detection point 11 are in correspondence relationship with one another. Further, regarding the detection points 11 corresponding to the predetermined locations at which each vehicle registration plate number reading apparatus 30A detects passage of the vehicle 50, the identification number for identifying each vehicle registration plate number reading apparatus 30A is held in correspondence relationship with the respective detection points 11. An example of the contents of the correspondence table is shown in FIG. 5.

Therefore, the acquisition unit 212 can identify at which detection point 11 the received return lights were generated by comparing the location in the optical fiber for sensing 10 at which the return lights were generated with the correspondence datable shown in FIG. 5.

Therefore, the acquisition unit 212 acquires, for each of the plurality of detection points 11, the sound information included in the return light based on the return lights generated at the respective detection points 11.

The frequency analysis unit 213 performs frequency analysis of the sound information acquired by the acquisition unit 212 for each of the plurality of detection points 11. The frequency analysis method may be, but not limited thereto, a method of wavelet transformation of sound information.

The filtering unit 214 performs filtering of the sound information that has been frequency-analyzed by the frequency analysis unit 213 for each of the plurality of detection points 11 in order to remove the noise components.

Here, the sound information at each detection point 11 of the plurality of detection points 11 that has been filtered by the filtering unit 214 includes the sound information such as an exhaust sound, road noise, and so forth of a vehicle 50 traveling on the road 40. Further, the sound information of the vehicle 50 indicates a unique sound pattern that varies dynamically depending on the features of the pertinent vehicle 50 (e.g. the vehicle type, the tire type, etc.).

Therefore, by analyzing the dynamic variation in the sound pattern unique to the vehicle 50 traveling on the road 40, the extraction unit 215 extracts the features of the traveling vehicle 50. A method of extracting the features of the vehicle 50 in the extraction unit 215 may be a method utilizing pattern matching, a method utilizing a learning model, and so forth like those described above. However, the method of extracting the features of the vehicle 50 is not limited thereto.

Further, regarding a vehicle 50 whose features are extracted from the sound information, the extraction unit 215 extracts the time at which the aforementioned sound information was detected and information about the detection point 11 as information indicating the trajectory of the location of the pertinent vehicle 50.

A vehicle registration plate number reading apparatus 31A is installed at a predetermined location on the road 40 and is configured to detect that the vehicle 50 has passed the predetermined location on the road 40 and read the vehicle registration plate number of the detected vehicle 50.

The integration unit 216 obtains the vehicle registration plate number of the vehicle 50 that has passed the predetermined location on the road 40 from the vehicle registration plate number reading apparatus 31A.

Further, the integration unit 216 identifies the sound information of the vehicle 50 detected by the optical fiber for sensing 10 at the detection point 11 corresponding to the predetermined location when the vehicle registration plate number reading apparatus 31A detects that the vehicle 50 has passed the predetermined location on the road 40 as the sound information of the vehicle 50 that has passed the predetermined location.

Then, the integration unit 216 integrates the vehicle registration plate number information of the vehicle 50 obtained from the vehicle registration plate number reading apparatus 31A and the information about the features and the trajectory of the location of the vehicle 50 extracted from the sound information identified above by the extraction unit 215 as information referring to the same vehicle 50. Then, the integration unit 216 registers the integrated information about the vehicle 50 in the vehicle DB 217.

The vehicle DB 217 is a database in which information about a plurality of vehicles 50 integrated by the integration unit 216 is registered for each vehicle 50 that has passed the predetermined location on the road 40. Specifically, for each of the plurality of vehicles 50, the vehicle registration plate number of the vehicle 50, the features of the vehicle 50, and the trajectory of the location of the vehicle 50 are registered in the vehicle DB 217. An example of the contents of the vehicle DB 217 is shown in FIG. 6.

Note that the integration unit 216 may obtain the camera image of the vehicle 50 that has passed the predetermined location on the road 40 from the vehicle registration plate number reading apparatus 31A. In this case, the integration unit 216 can extract the features such as the vehicle type, the color, and so on of the vehicle 50 by analyzing the obtained camera image. However, regarding the vehicle type of the vehicle 50, it is extracted from both the camera image and the sound information. As described above, regarding the features extracted from both the camera image and the sound information, the integration unit 216 may determine the features identified from the camera image and the sound information whichever having the higher preset priority as the features of the vehicle 50. For example, regarding the vehicle type of the vehicle 50, the camera image is given higher priority. On the other hand, regarding the color of the vehicle 50, it is extracted only from the camera image. Therefore, the integration unit 216 may also register the color of the vehicle 50 as the information about the vehicle 50 in the vehicle DB 217.

The retrieval unit 218 identifies the vehicle 50 that is detected by the vehicle registration plate number reading apparatus 31A as having passed the predetermined location on the road 40 as the vehicle-to-be-monitored and retrieves, using the vehicle registration plate number of the identified vehicle-to be monitored as a key, information about the vehicle-to-monitored from the vehicle DB 217.

For example, the retrieval unit 218 can identify the features (e.g. the vehicle type, the tire type, etc.) of the vehicle-to-be-monitored from the vehicle DB 217. Further, the retrieval unit 218 can identify the location and the trajectory of the location of the vehicle-to-be-monitored (the time and the detection point 11 at which the sound information of the vehicle-to-be-monitored was detected) from the vehicle DB 217.

Further, the retrieval unit 218 is able to track the vehicle-to-be-monitored based on the trajectory of the location of the vehicle-to-be-monitored.

Figure 7:
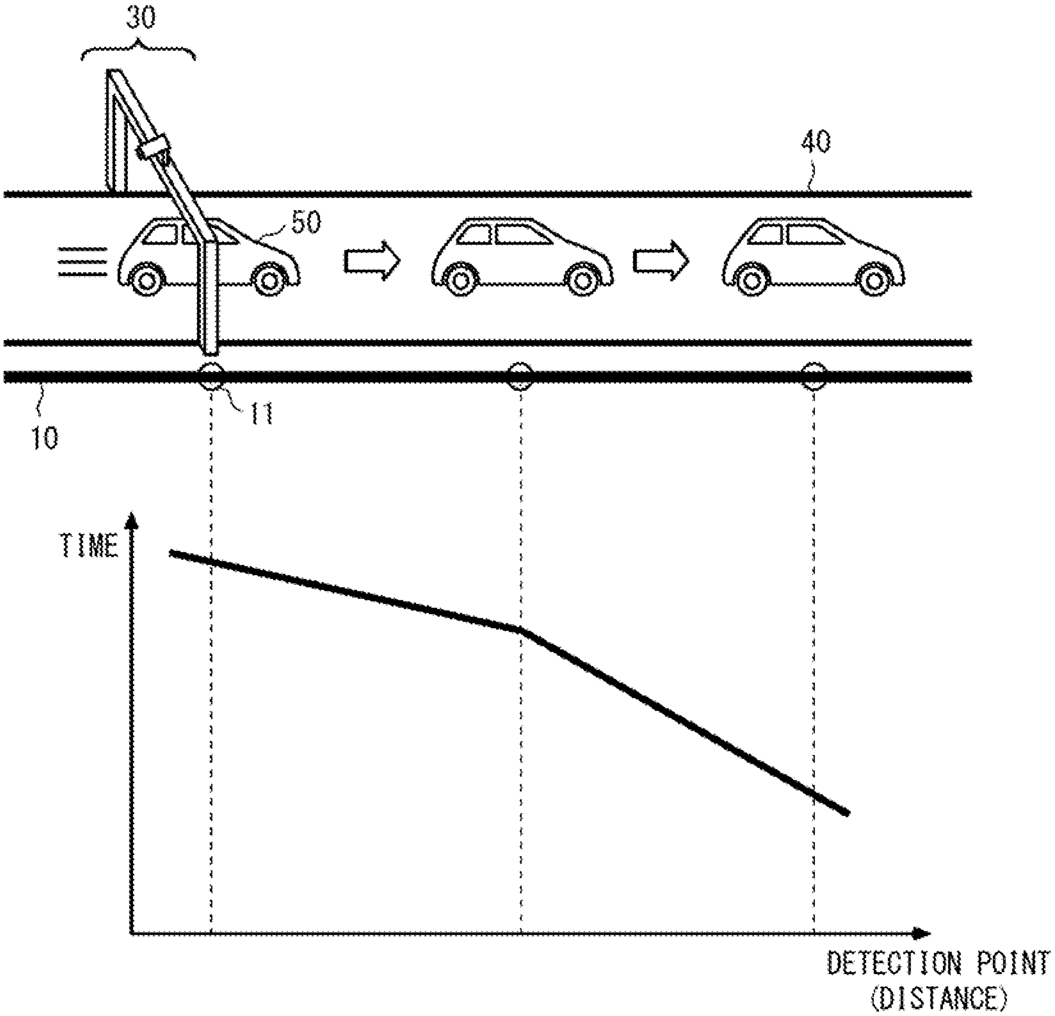
FIG. 7 is a diagram showing an example of data that is obtainable by a retrieval unit according to the second example embodiment.

Further, the retrieval unit 218 can obtain data like that shown in the bottom diagram of FIG. 7 based on the trajectory of the location of vehicle-to-monitored. In the bottom diagram of FIG. 7, the horizontal axis indicates the location of the detection point 11 (the distance from the vehicle-to-be-monitored 20) and the vertical axis indicates the time at which the sound information of the vehicle-to-be-monitored was detected at the pertinent detection point 11.

In the bottom diagram of FIG. 7, it is represented by a single diagonal line that one vehicle 50 is traveling on the road 40. Here, positive/negative of the line indicate the direction in which the vehicle 50 is traveling, the inclination of the line indicates the speed at which the vehicle 50 is traveling, and a change in the inclination of the line indicates that the vehicle 50 has accelerated or decelerated.

Therefore, the retrieval unit 218 can identify the traveling direction, the traveling speed, and acceleration/deceleration of the vehicle-to-be-monitored based on the data shown in the bottom diagram of FIG. 7.

Next, operation of the vehicle monitoring system according to the second example embodiment will be described.

First, operation flow of registering information of a vehicle 50 that has passed the aforementioned predetermined location on the road 40 into the vehicle DB 217 will be described with reference to FIG. 8.

Figure 8:
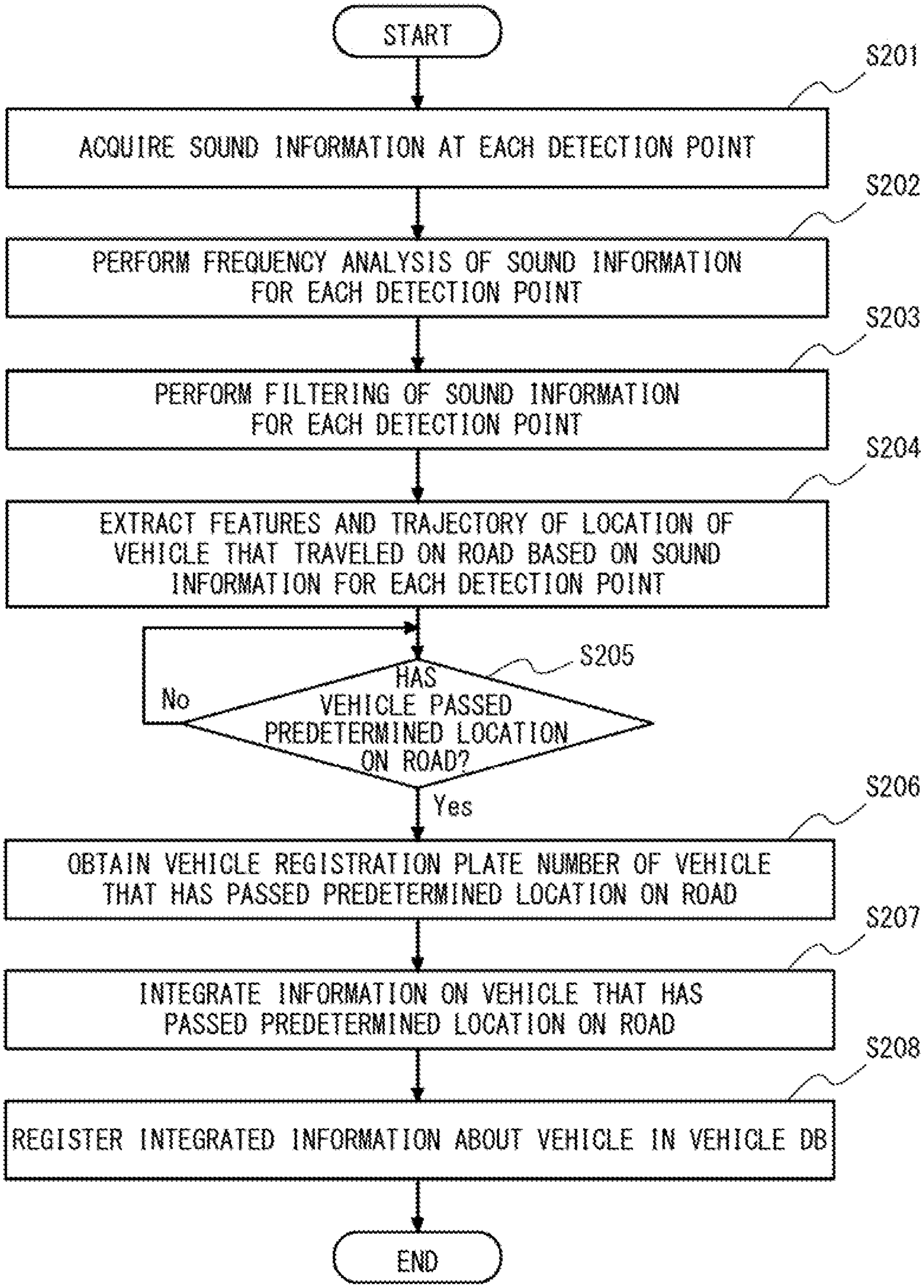
FIG. 8 is a flowchart showing an example of operation flow of registering information about a vehicle that has passed a predetermined location on the road in a vehicle DB in the vehicle monitoring system according to the second example embodiment.

As shown in FIG. 8, first, the acquisition unit 212 acquires sound information at each of the plurality of detection points 11 in the optical fiber for sensing 10 from the return lights received by the reception unit 211 (Step S201).

Next, the frequency analysis unit 213 performs frequency analysis of the sound information for each of the plurality of detection points 11 acquired by the acquisition unit 212 (Step S202) and the filtering unit 214 performs filtering of the sound information that has been frequency-analyzed by the frequency analysis unit 213 for each of the plurality of detection points 11 (Step S203).

Next, the extraction unit 215 extracts the information about the features and the trajectory of the location of the vehicle 50 traveling on the road 40 based on the sound information that has been filtered by the filtering unit 214 for each of the plurality of detection points 11 (Step S204).

Here, when the vehicle registration plate number reading apparatus 31A detects that the vehicle 50 has passed a predetermined location on the road 40 (Yes in Step S205), the integration unit 216 obtains the vehicle registration plate number of the vehicle 50 that has passed the predetermined location on the road 40 from the vehicle registration plate number reading apparatus 31A (Step S206).

Next, the integration unit 216 identifies the sound information of the vehicle 50 detected by the optical fiber for sensing 10 at the detection point 11 corresponding to the predetermined location when the vehicle registration plate number reading apparatus 31A detects that the vehicle 50 has passed the predetermined location on the road 40 as the sound information of the vehicle 50 that has passed the predetermined location. Then, the integration unit 216 integrates the vehicle registration plate number information of the vehicle 50 obtained from the vehicle registration plate number reading apparatus 31A and the information about the features and the trajectory of the location of the vehicle 50 extracted from the sound information identified above by the extraction unit 215 as information about the same vehicle 50 (Step S207).

Then, the integration unit 216 registers the integrated information about the vehicle 50 in the vehicle DB 217 (Step S208).

Next, an example of operation flow of retrieving information about a vehicle-to-be-monitored from the vehicle DB 217 will be described with reference to FIG. 9.

Figure 9:
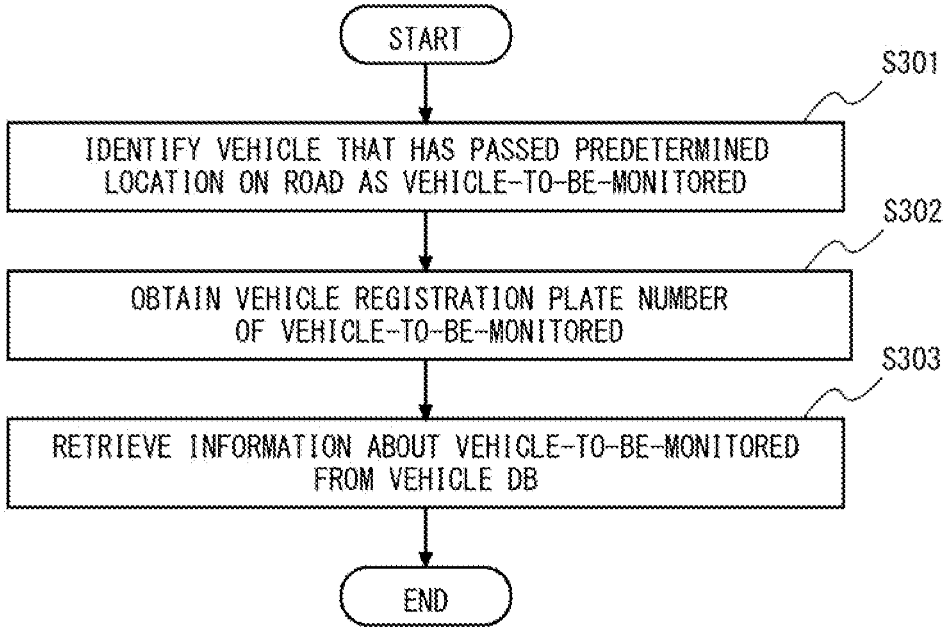
FIG. 9 is a flowchart showing an example of operation flow of retrieving information about a vehicle-to-be-monitored from the vehicle DB in the vehicle monitoring system according to the second example embodiment.

As shown in FIG. 9, first, the retrieval unit 218 identifies the vehicle 50 that is detected by the vehicle registration plate number reading apparatus 31A as having passed the predetermined location on the road 40 as the vehicle-to-be-monitored (Step S301).

Next, the retrieval unit 218 obtains the vehicle registration plate number of the vehicle-to-be-monitored from the vehicle registration plate number reading apparatus 31A (Step S302).

Then, the retrieval unit 218 retrieves information about the vehicle-to-be-monitored from the vehicle DB 217 using the vehicle registration plate number of the vehicle-to be monitored as a key (Step S303). For example, the retrieval unit 218 can specify the features, the location, and the trajectory of the location of the vehicle-to-be-monitored from the vehicle DB 217. Further, the retrieval unit 218 is capable of tracking the vehicle-to-be-monitored based on the trajectory of the location of vehicle-to-be-monitored. Further, the retrieval unit 218 can identify the traveling direction, the traveling speed, and acceleration/deceleration of the vehicle-to-be-monitored based on the trajectory of location of the vehicle-to-be-monitored.

As described above, according to the second example embodiment, the extraction unit 215 extracts information about the features and the trajectory of the location of the vehicle 50 traveling on the road 40 based on the sound information at each of the plurality of detection points 11 in the optical fiber for sensing 10. The integration unit 216 integrates the vehicle registration plate number of the vehicle 50 that has passed the predetermined location on the road 40 and the information about the features and the trajectory of the location of the vehicle 50 extracted based on the sound information of the vehicle 50 and registers the integrated information about the vehicle 50 in the vehicle DB 217. The retrieval unit 218 identifies the vehicle 50 that has passed the predetermined location on the road 40 as the vehicle-to-be-monitored, and retrieves information about the identified vehicle-to-be-monitored from the vehicle DB 217. Therefore, since the vehicle-to-be-monitored can be identified among a plurality of vehicles 50 traveling on the road 40, the vehicle-to-be-monitored can be monitored with high accuracy. Other effects are the same as those of the aforementioned first example embodiment.

Hardware Configuration of Vehicle Monitoring Apparatuses According to First Example Embodiment and Second Example Embodiment Next, hardware configuration of the computer 60 for implementing the aforementioned vehicle monitoring apparatuses 20 and 20A according to the first and the second example embodiments will be described with reference to FIG. 10.

Figure 10:
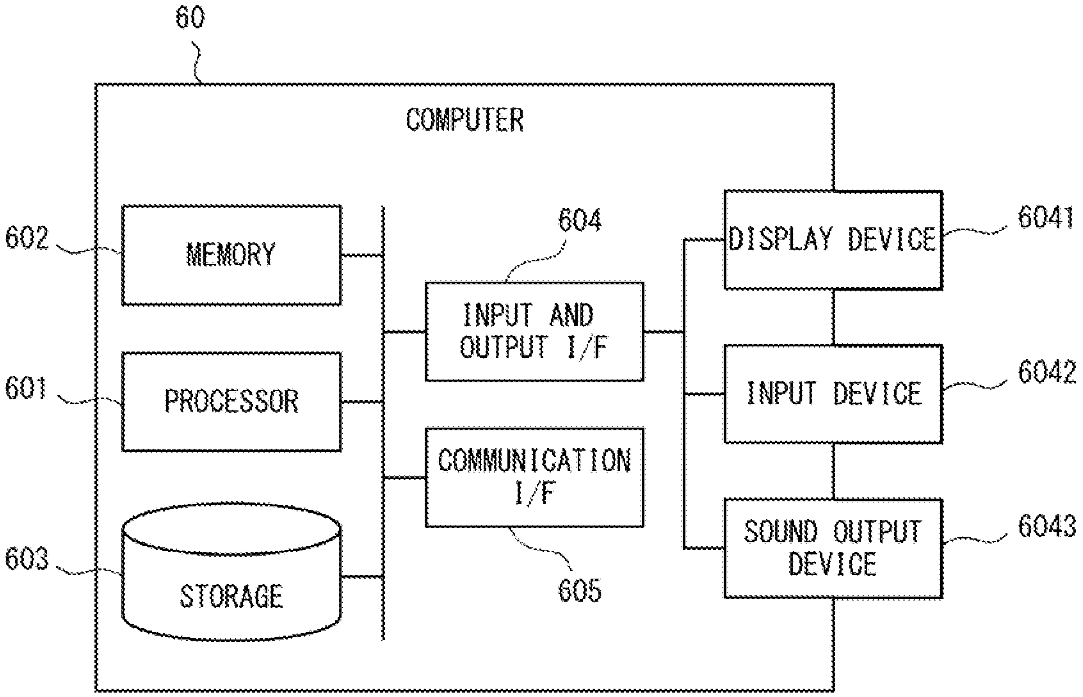
FIG. 10 is a block diagram showing a hardware configuration of a computer that realizes the vehicle monitoring apparatuses according to the example embodiments.

As shown in FIG. 10, the computer 60 includes a processor 601, a memory 602, a storage 603, an input/output interface (input and output I/F) 604, a communication interface (communication I/F) 605, and so forth. The processor 601, the memory 602, the storage 603, the input/output interface 604, and the communication interface 605 are connected with one another via a data transmission line for transmitting and receiving data with one another.

The processor 601 is a processing unit such as a CPU (Central Processing Unit), a GPU (Graphics Processing Unit), or the like. The memory 602 is a memory such as a RAM (Random Access Memory), a ROM (Read Only Memory), or the like. The storage 603 may be a storage apparatus such a HDD (Hard Disk Drive), a SSD (Solid State Drive), a memory card, or the like. Further, the storage 603 may be a memory such as a RAM, a ROM, or the like.

The storage 603 stores programs for implementing the functions of the structural elements of the vehicle monitoring apparatuses 20 and 20A. The processor 601 implements the functions of the structural elements of the vehicle monitoring apparatuses 20 and 20A by executing these programs. Here, in executing the aforementioned programs, the processor 601 may read out these programs onto the memory 602 before executing them, or may execute the programs without reading them out onto the memory 602. Further, the memory 602 and the storage 603 also serve to store information and data held by the structural elements of the vehicle monitoring apparatuses 20 and 20A.

Further, the aforementioned program can be stored and provided to a computer (including the computer 60) using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-ROM), CD-R (Compact Disc-Recordable), CD-R/W (CD-ReWritable), and semiconductor memories (such as mask ROM, PROM (Programmable ROM), EPROM (Erasable PROM), flash ROM, and RAM). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

The input/output interface 604 is connected to a display device 6041, an input device 6042, a sound output device 6043, and so forth. The display device 6041 is a device that displays a screen corresponding to graphics data processed by the processor 601, such as a LCD (Liquid Crystal Display), a CRT (Cathode Ray Tube) display, or a monitor. The input device 6042 is a device that accepts operator's operation input, such as a keyboard, a mouse, or a touch sensor. The display device 6041 and the input device 6042 may be integrated and implemented as a touch panel. The sound output device 6043 is a device that performs acoustic output of sounds corresponding to acoustic data processed by the processor 601, such as a speaker.

The communication interface 605 transmits and receives data to and from external devices. For example, the communication interface 605 performs communication with external devices via s wired communication line or a wireless communication line.

The present disclosure has been described above with reference to the example embodiments. However, the present disclosure is not to be limited in any way by the example embodiments described above. Various modifications can be made to the configuration and details of the present disclosure without departing from the spirit and scope of the present disclosure.

For example, in the second example embodiment described above, the retrieval unit 218 can identify the traveling speed of the vehicle-to-be-monitored and acceleration/deceleration of the vehicle-to-be-monitored. Therefore, the retrieval unit 218 may identify the vehicles-to-be-monitored which are traveling at a speed exceeding the legal speed limit and the vehicles-to-be-monitored which are repeating acceleration and deceleration or are making heavy use of sudden braking as vehicles that are driven dangerously. When a vehicle that is driven dangerously is identified, the retrieval unit 218 may send an alert notification to a navigation apparatus mounted on the vehicle that is driven dangerously or on a vehicle 50 which is traveling nearby the vehicle that is driven dangerously, or a traffic information display apparatus installed on the road 40. The method of sending an alert notification may be a method of displaying the contents of alert notification to the alerted destination or a method of audio outputting the contents of alert notification from the alerted destination.

Further, in the first and the second example embodiments described above, the optical fiber for sensing 10 detected sound information of the vehicle 50 that is traveling on the road 40. However, the characteristics of the return lights transmitted through the optical fiber for sensing 10 change also when the temperature of the road 40 changes. Therefore, the optical fiber for sensing 10 can also detect temperature information of the road 40 and further, the return light transmitted through the optical fiber for sensing 10 also includes temperature information detected by the optical fiber for sensing 10. Therefore, the acquisition unit 212 may acquire temperature information for each of the plurality of detection points 11 in the optical fiber for sensing 10 and identify the detection points 11 at which the road surface is frozen based on the temperature information for each of the plurality of detection points 11. Note that identification of the detection points 11 at which the road surface is frozen may be performed by the acquisition unit 212 or may be performed by the other structural elements of the vehicle monitoring apparatus 20A.

Further, in the second example embodiment described above, the retrieval unit 218 can identify the features (e.g. the type of tire) of the vehicle-to-be-monitored and the trajectory of the location of the vehicle-to-be-monitored. Further, as described above, the retrieval unit 212 or other structural elements can identify the detection points 11 at which the road surface is frozen. Therefore, the retrieval unit 218 may identify that a vehicle-to-monitored with summer tires is approaching the detection point 11 at which the road surface is frozen. When it is identified that the vehicle-to-be-monitored with normal tires is approaching the detection point 11 at which the road surface is frozen, the retrieval unit 218 may send an alert to the navigation apparatus mounted on the vehicle-to-be-monitored or to a traffic information display apparatus installed on the road 40. The method of sending an alert is the same at that described above.

Further, in the aforementioned first and second example embodiments, the sound information of the vehicle 50 traveling on the road 40 is detected by the optical fiber for sensing 10, but it is not limited thereto. A microphone may be installed at an arbitrary location on the road 40 and sound information of the vehicle 50 traveling on the road 40 may be collected with this microphone.

Further, in the aforementioned first and second example embodiments, a plurality of structural elements are provided to the vehicle monitoring apparatuses 20 and 20A but it is not limited thereto. The plurality of structural elements provided to the vehicle monitoring apparatuses 20 and 20A are not necessarily provided to one apparatus and may be distributed in a plurality of apparatuses.

The whole or part of the example embodiments disclosed above can be described as, but not limited to, the following supplementary notes.

(Supplementary Note 1)

A vehicle monitoring system comprising:

an optical fiber for sensing laid on a road;

a vehicle passage detection unit configured to detect that a vehicle has passed a predetermined location on the road;

an identification unit configured to identify the vehicle that has passed the predetermined location as a vehicle-to-be-monitored; and a reception unit configured to receive sound information unique to the vehicle-to-be-monitored detected by the optical fiber for sensing, wherein the identification unit identifies the vehicle-to-be-monitored based on the sound information unique to the vehicle-to-be-monitored.

(Supplementary Note 2)

The vehicle monitoring system described in Supplementary Note 1, wherein the identification unit identifies features and location of the vehicle-to-be-monitored based on the sound information unique to the vehicle-to-be-monitored.

(Supplementary Note 3)

The vehicle monitoring system described in Supplementary Note 2, wherein the identification unit identifies a trajectory of the location of the vehicle-to-be-monitored based on the sound information unique to the vehicle-to-be-monitored detected by the optical fiber for sensing at a plurality of detection points and tracks the vehicle-to-be-monitored based on the identified trajectory of the location of the vehicle-to-be-monitored.

(Supplementary Note 4)

The vehicle monitoring system described in Supplementary Note 2 or 3, wherein the identification unit identifies sound information of a vehicle detected by the optical fiber for sensing at a detection point corresponding to the predetermined location when the vehicle-to-be-monitored has passed the predetermined location as the sound information unique to the vehicle-to-be-monitored.

(Supplementary Note 5)

The vehicle monitoring system described in any one of Supplementary Notes 2 to 4, wherein the vehicle passage detection unit is a vehicle registration plate number reading apparatus that reads a vehicle registration plate number of the vehicle that has passed the predetermined location.

(Supplementary Note 6)

The vehicle monitoring system described in Supplementary Note 5, wherein the identification unit holds the features and the location of the vehicle-to-be-monitored in a correspondence relationship with the vehicle registration plate number read by the vehicle passage detection unit.

(Supplementary Note 7)

A vehicle monitoring method performed by a vehicle monitoring system, comprising:

a vehicle passage detection step of detecting that a vehicle has passed a predetermined location on a road;

a first identification step of identifying the vehicle that has passed the predetermined location as a vehicle-to-be-monitored;

a reception step of receiving sound information unique to the vehicle-to-be-monitored detected by an optical fiber for sensing laid on the road; and a second identification step of identifying the vehicle-to-be-monitored based on the sound information unique to the vehicle-to-be-monitored.

(Supplementary Note 8)

The vehicle monitoring method described in Supplementary Note 7, wherein in the second identification step, features and location of the vehicle-to-be-monitored are identified based on the sound information unique to the vehicle-to-be-monitored.

(Supplementary Note 9)

The vehicle monitoring method described in Supplementary Note 8, wherein in the second identification step, a trajectory of the location of the vehicle-to-be-monitored is identified based on the sound information unique to the vehicle-to-be-monitored detected by the optical fiber for sensing at a plurality of detection points and the vehicle-to-be-monitored is tracked based on the identified trajectory of the location of the vehicle-to-be-monitored.

(Supplementary Note 10)

The vehicle monitoring method described in Supplementary Note 8 or 9, wherein in the second identification step, sound information of a vehicle detected by the optical fiber for sensing at a detection point corresponding to the predetermined location when the vehicle-to-be-monitored has passed the predetermined location is identified as the sound information unique to the vehicle-to-be-monitored.

(Supplementary Note 11)

The vehicle monitoring method described in any one of Supplementary Notes 8 to 10, wherein in the vehicle passage detection step, a vehicle registration plate number of the vehicle that has passed the predetermined location is read.

(Supplementary Note 12)

The vehicle monitoring method described in Supplementary Note 11, wherein in the second identification step, the features and the location of the vehicle-to-be-monitored are held in a correspondence relationship with the vehicle registration plate number read in the vehicle passage detection step.

(Supplementary Note 13)

A vehicle monitoring apparatus comprising:

an identification unit configured to identify a vehicle that has passed a predetermined location on a road as a vehicle-to-be-monitored; and a reception unit configured to receive sound information unique to the vehicle-to-be-monitored detected by an optical fiber for sensing laid on the road, wherein the identification unit identifies the vehicle-to-be-monitored based on the sound information unique to the vehicle-to-be-monitored.

REFERENCE SIGNS LIST

10 OPTICAL FIBER FOR SENSING
20, 20A VEHICLE MONITORING APPARATUS
201 RECEPTION UNIT
202 IDENTIFICATION UNIT
211 RECEPTION UNIT
212 ACQUISITION UNIT
213 FREQUENCY ANALYSIS UNIT
214 FILTERING UNIT
215 EXTRACTION UNIT
216 INTEGRATION UNIT
217 VEHICLE DB
218 RETRIEVAL UNIT
30 VEHICLE PASSAGE DETECTION UNIT
30A VEHICLE REGISTRATION PLATE NUMBER READING APPARATUS
40 ROAD
50 VEHICLE
60 COMPUTER
601 PROCESSOR
602 MEMORY
603 STORAGE
604 INPUT/OUTPUT INTERFACE
6041 DISPLAY DEVICE
6042 INPUT DEVICE
6043 SOUND OUTPUT DEVICE
605 COMMUNICATION INTERFACE

What is claimed is:

1. A vehicle monitoring system comprising:

an optical fiber for sensing, the optical fiber laid on a road;

an electronic toll collection (ETC) gate or a vehicle registration plate number reading apparatus including a camera, the ETC gate or the vehicle registration plate number reading apparatus configured to detect that a vehicle has passed a predetermined location on the road;

a vehicle monitoring apparatus including a processor and a memory storing instructions executable by the processor to:

identify the vehicle that has passed the predetermined location as a vehicle-to-be-monitored;

receive sound information unique to the vehicle-to-be-monitored, the sound information detected by the optical fiber;

identify a location of the vehicle-to-be-monitored based on the sound information;

identify features of the vehicle-to-be-monitored based on pattern matching between a sound pattern indicated by the sound information and a matching pattern.

2. The vehicle monitoring system according to claim 1, wherein the the instructions are executable by the processor to:

identify a trajectory of the vehicle-to-be-monitored based on the sound information unique to the vehicle-to-be-monitored detected by the optical fiber at a plurality of detection points; and track the vehicle-to-be-monitored based on the identified trajectory.

3. The vehicle monitoring system according to claim 1, wherein the instructions are executable by the processor to identify sound information of a vehicle detected by the optical fiber at a detection point corresponding to the predetermined location when the vehicle-to-be-monitored has passed the predetermined location, as the sound information unique to the vehicle-to-be-monitored.

4. The vehicle monitoring system according to claim 1, comprising the vehicle registration plate number reading apparatus, wherein the vehicle registration plate number reading apparatus reads a vehicle registration plate number of the vehicle that has passed the predetermined location.

5. The vehicle monitoring system according to claim 4, wherein the processor stores the features and the location of the vehicle-to-be-monitored in a correspondence relationship with the vehicle registration plate number read by the vehicle registration plate number reading apparatus.

6. A vehicle monitoring method comprising:

detecting, by an electronic toll collection (ETC) gate or a vehicle registration plate number reading apparatus including a camera, that a vehicle has passed a predetermined location on a road;

identifying, by a processor of a vehicle monitoring apparatus executing instructions stored on a memory of the vehicle monitoring apparatus, the vehicle that has passed the predetermined location as a vehicle-to-be-monitored;

receiving, by the processor, sound information unique to the vehicle-to-be-monitored, the sound information detected by an optical fiber for sensing laid on the road; and identifying, by the processor, a location of the vehicle-to-be-monitored based on the sound information; and identifying, by the processor, features of the vehicle-to-be-monitored based on pattern matching between a sound pattern indicated by the sound information and a matching pattern.

7. The vehicle monitoring method according to claim 6, comprising:

identifying a trajectory of the vehicle-to-be-monitored based on the sound information unique to the vehicle-to-be-monitored detected by the optical fiber at a plurality of detection points; and tracking the vehicle-to-be-monitored based on the identified trajectory.

8. The vehicle monitoring method according to claim 6, comprising identifying sound information of a vehicle detected by the optical fiber for sensing at a detection point corresponding to the predetermined location when the vehicle-to-be-monitored has passed the predetermined location, as the sound information unique to the vehicle-to-be-monitored.

9. The vehicle monitoring method according to claim 6, comprising reading, by the vehicle registration plate number reading apparatus, that a vehicle registration plate number of the vehicle that has passed the predetermined location is read.

10. The vehicle monitoring method according to claim 9, comprising storing the features and the location of the vehicle-to-be-monitored are held in a correspondence relationship with the vehicle registration plate number that has been read.

11. A vehicle monitoring apparatus comprising:

a processor; and a memory storing instructions executable by the processor to:

identify a vehicle that has passed a predetermined location on a road as a vehicle-to-be-monitored;

receive sound information unique to the vehicle-to-be-monitored, the sound information detected by an optical fiber for sensing laid on the road;

identify a location of the vehicle-to-be-monitored based on the sound information; and identify features of the vehicle-to-be-monitored based on pattern matching between a sound pattern indicated by the sound information and a matching pattern.

* * * * *